US005551292A

United States Patent [19]
Terajima et al.

[11] Patent Number: 5,551,292
[45] Date of Patent: Sep. 3, 1996

[54] ANGULAR VELOCITY DETECTION CIRCUIT FOR VIBRATORY GYROSCOPES

[75] Inventors: Kokichi Terajima, Tokyo; Shinichi Aotsu, Urawa, both of Japan

[73] Assignee: Akai Electric Co., Ltd., Tokyo, Japan

[21] Appl. No.: 371,028

[22] Filed: Jan. 10, 1995

[30] Foreign Application Priority Data

Mar. 22, 1994 [JP] Japan .................................. 6-050103

[51] Int. Cl.⁶ .................................................. G01P 3/00
[52] U.S. Cl. ........................................................ 73/504.12
[58] Field of Search ........................ 73/862.59, DIG. 1, 73/504.12, 504.02, 504.03; 74/5.6 R, 5.6 D; 310/316, 319

[56] References Cited

U.S. PATENT DOCUMENTS

| | | | |
|---|---|---|---|
| 4,510,802 | 4/1985 | Peters | 73/505 |
| 5,355,730 | 10/1994 | Koizumi | 73/505 |

FOREIGN PATENT DOCUMENTS

| | | | |
|---|---|---|---|
| 0533163A3 | 9/1992 | European Pat. Off. | G01C 19/56 |
| 0579974A1 | 6/1993 | European Pat. Off. | G01C 19/56 |

*Primary Examiner*—Hezron E. Williams
*Assistant Examiner*—Christine K. Oda
*Attorney, Agent, or Firm*—Meltzer, Lippe, Goldstein, et al.

[57] ABSTRACT

An angular velocity detection circuit is capable of detecting angular velocity at good efficiency, while also being capable of suppressing the formation of offset to very low amounts even when differences arise in the equivalent resistances of a piezo-electric pair. The vibrator has at least one pair of piezo-electric elements on the side surface of a vibration member having a resonance point. A detection circuit detects differences in the currents flowing through the piezo-electric elements under the resonance state of the vibrator. A sample and hold circuit samples and holds the output of the detection circuit at a time where the displacement velocity of the vibrator becomes zero. The angular velocity is detected based on the output of this sample hold circuit.

2 Claims, 6 Drawing Sheets

ANGULAR VELOCITY DETECTION CIRCUIT FOR VIBRATORY GYROSCOPES

RELATED APPLICATIONS

The following patent applications have been filed in the United States Patent and Trademark Office concurrently and are hereby incorporated by reference:

VIBRATION CONTROL APPARATUS HAVING AUTOMATIC GAIN CONTROL, to K. Terajima, U.S. application Ser. No. 08/371,031, claiming priority of Japanese Patent Application Nos.: 6-153953 and 6-168142;

VIBRATION CONTROL DEVICE FOR SAFELY INDUCED VIBRATION OF GYROSCOPES to K. Terajima, U.S. application Ser. No. 08/371,029, claiming priority of Japanese Patent Application Nos.: 6-2364, 6-157493, 6-10348 and 6-168141; and VIBRATION CONTROL APPARATUS HAVING OSCILLATION FREQUENCY REGULATION to K. Terajima, U.S. application Ser. No. 08/371,026, claiming priority of Japanese Patent Application Nos.: 6-205405 and 6-188403.

FIELD OF THE INVENTION

This invention relates to an angular velocity detection circuit for detecting angular velocity, particularly in a piezo-electric type vibrating gyroscope.

BACKGROUND OF THE INVENTION

Examples of vibrating gyroscopes were disclosed by the present applicant in Japanese Patent Disclosure Hei 5-113336 and Japanese Patent Application Hei 6-10348. In these prior circuits, angular velocity is detected by the difference in the currents flowing in two piezo-electric elements having three functions: excitation, detection and feedback.

Figure 4:
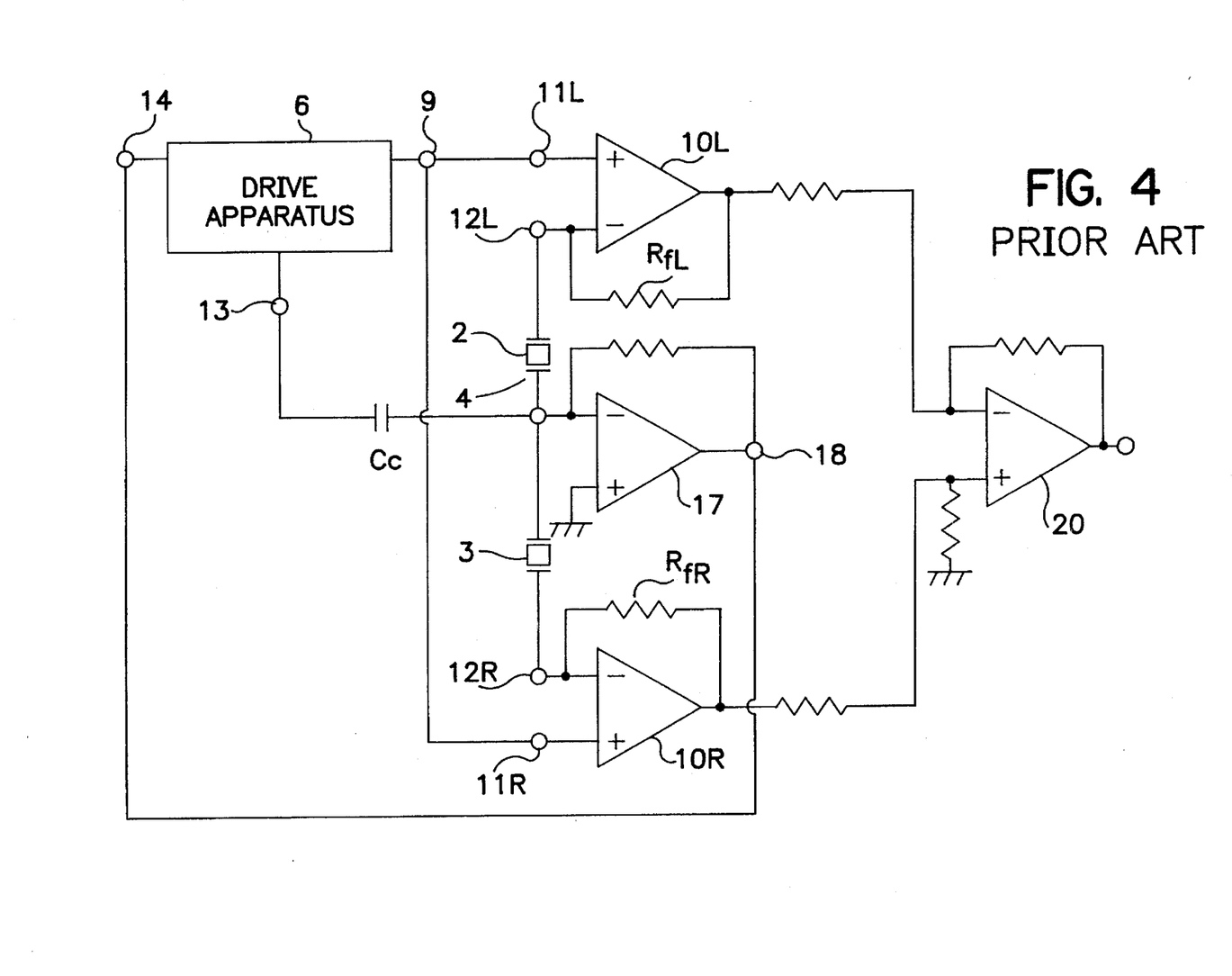
FIG. 4 illustrates an example of a conventional vibrating gyroscope to which the invention can be applied.

FIG. 4 illustrates a vibrating gyroscope disclosed in Japanese Patent Application Hei 6-10348. The signal output terminal 9 of drive apparatus 6 is respectively connected to signal input terminals 11L and 11R of feedback amplifiers 10L and 10R having feedback resistances $Rf_L$ and $Rf_R$. Each of the feedback input terminals 12L and 12R of feedback amplifiers 10L and 10R are connected to one electrode each of piezo-electric elements 2 and 3 that form vibrator 4. The other electrodes of piezo-electric elements 2 and 3 are connected via capacitor Cc to compensation signal output terminal 13 of drive apparatus 6. The compensation signal of the damping capacity of vibrator 4 is outputted at the compensation signal output terminal 13. The signals of the other electrodes of piezo-electric elements 2 and 3 are combined with the compensation signal. The combined signal is amplified at cumulative amplifier 17. Output terminal 18 of the cumulative amplifier 17 is connected to input terminal 14 of the drive apparatus 6, so that vibrator 4 is given self-induced vibration. The outputs of feedback amplifiers 10L and 10R are supplied to differential amplifier 20, so that the Coriolis force arising from the angular velocity acting on vibrator 4 is detected at the output of differential amplifier 20.

Figure 5:
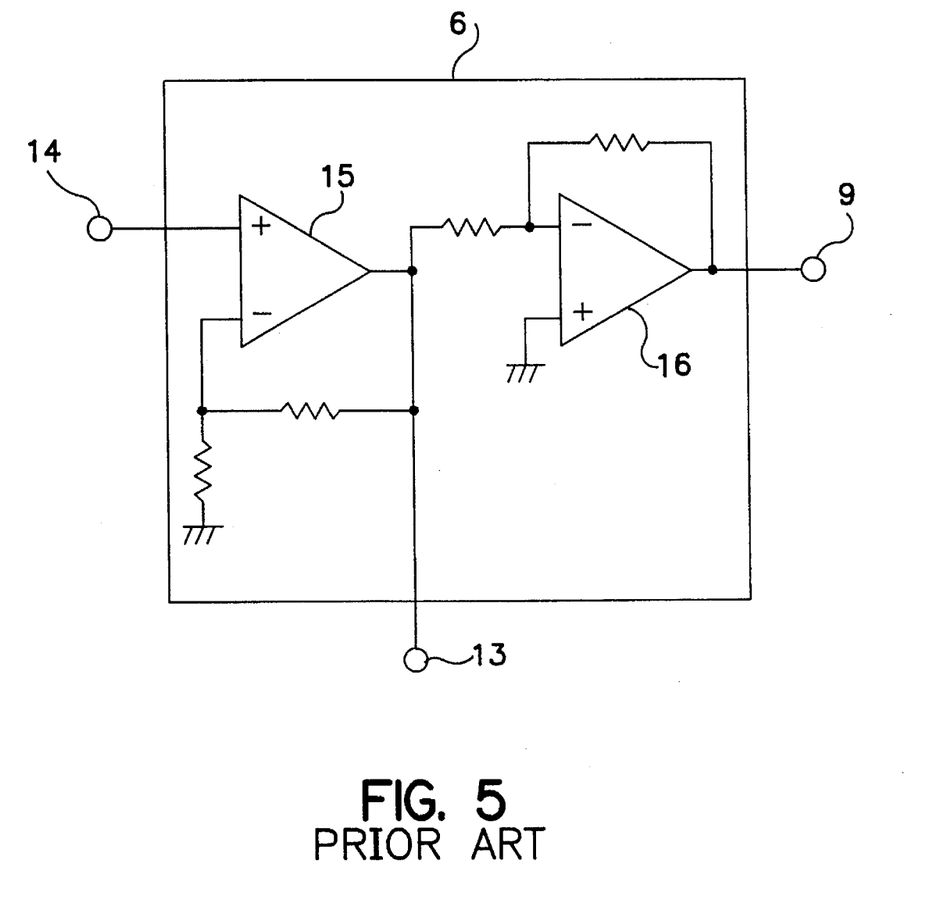
FIG. 5 illustrates an example of a conventional drive apparatus shown in FIG. 4, FIGS. 6 A–F illustrate examples of vibrators that can be used with the invention.

Drive apparatus 6, as shown in FIG. 5, has a non-inverting amplifier 15 and an inverting amplifier 16. The signal from input terminal 14 is amplified at non-inverting amplifier 15. The output of non-inverting amplifier 15 is the compensation signal at compensation signal output terminal 13 and is also amplified at inverting amplifier 16 to supply a drive signal to the signal output terminal 9. There is a 180° difference in phase between the drive signal and the compensation signal. The amplitude ratio of these signals is suitably set by inverting amplifier 16.

Figure 6A:
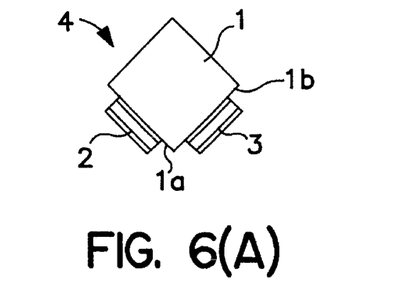
Figure 6B:
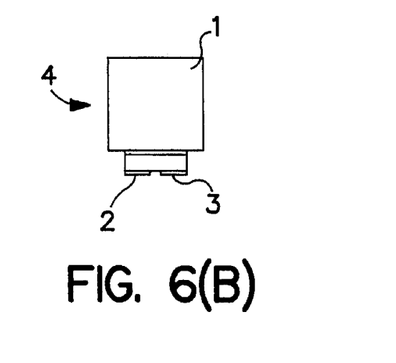
Figure 6C:
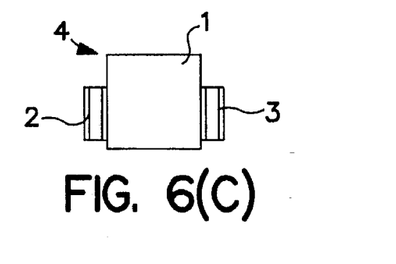
Figure 6D:
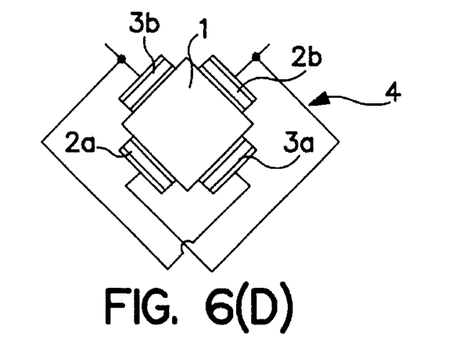

Examples of the vibrator 4 are shown in FIGS. 6(A) to (F). As shown in FIG. 6(A), the vibrator 4 has a square cross-sectional shape and has piezo-electric element 2 on one side surface 1a of vibration member 1 having a resonance point and piezo-electric element 3 on another side surface 1b adjoining side surface 1a. As shown in FIG. 6(B), the vibrator 4 has piezo-electric elements 2 and 3 split in the wide direction on the same side of vibration member 1. As shown in FIG. 6(C), the vibrator 4 has piezo-electric elements 2 and 3 shifted off center on opposite sides of vibration member 1. As shown in FIG. 6(D), the vibrator 4 has the respective piezo-electric elements 2a and 2b on opposite side surfaces of vibration member 1 and connects them in parallel so that they act essentially as one piezo-electric element 2, while also having the respective piezo-electric elements 3a and 3b on the other opposite sides of vibration member 1 so as to connect them in parallel so that they act essentially as one piezo-electric element 3.

Figure 6E:
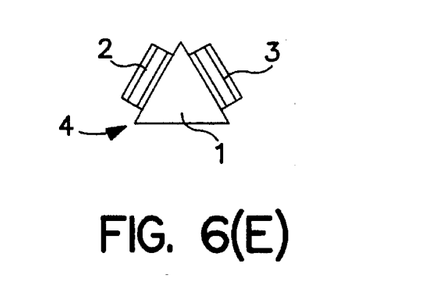
Figure 6F:
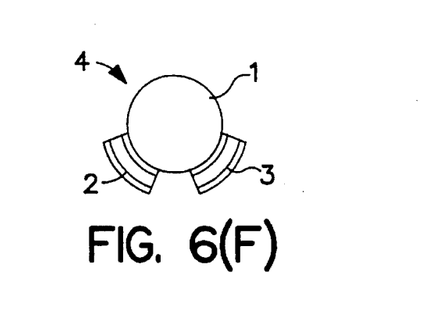

As shown in FIG. 6(E), vibrator 4 has a triangular cross-sectional shape and has piezo-electric elements 2 and 3 on two side surfaces of vibration member 1 having a resonance point. As shown in FIG. 6(F), vibrator 4 has a circular cross-sectional shape and has piezo-electric elements 2 and 3 on the peripheral surface of vibrator member 1 having a resonance point. Thus, members having essentially two piezo-electric elements are formed on the side surfaces of vibration members having various sectional shapes.

With the vibrating gyroscope illustrated in FIG. 4, the imaginary part of the current, relative to the respective damping capacities Cd, flowing in piezo-electric elements 2 and 3 are extinguished by the combined compensation signal flowing through capacitor Cc. Therefore, the output of integrating amplifier 17 becomes only the real part of the current flowing in piezo-electric elements 2 and 3. Consequently, the voltage gain of integrating amplifier 17 maximizes at the mechanical series resonance frequency $f_s$ of vibrator 4, so that vibrator 4 can be stabilized at a frequency in accurate agreement with the mechanical series resonance frequency $f_s$ to give it self-induced vibration.

When angular velocity acts on vibrator 4, a Coriolis force is created and a difference arises between the currents which flow in piezo-electric elements 2 and 5. As a result, there is a difference in the output voltages of the two feedback amplifiers 10L and 10R, so that, for example, by supplying the output of differential amplifier 20 to a synchronous detection circuit and detecting when it is synchronous with the drive signal from drive apparatus 6, it becomes possible to detect the direction and size of the angular velocity.

Figure 7:
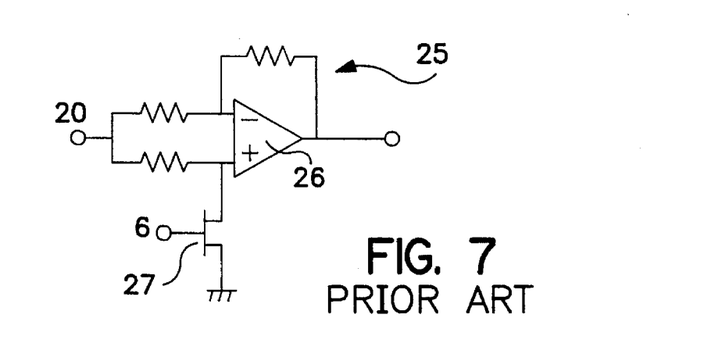
FIG. 7 illustrates an example of a conventional synchronous detection circuit.

FIG. 7 illustrates an example of such a synchronous detection circuit. This synchronous detection circuit 25 has a feedback amplifier 26 and a switching element 27, comprising a field-effect type transistor (FET), connected to its non-inverting input terminal. The output of differential amplifier 20 is applied in parallel to the inverting and non-inverting input terminals of differential amplifier 26, while the drive signal from drive apparatus 6 is supplied to the gate terminal of switching element 27. By having the non-inverting input terminal of feedback amplifier 26 synchronized with the drive signal and grounded, it is possible to have synchronous detection of the output of differential amplifier 20.

Also, Japanese Patent Disclosure Sho 62-150116 discloses the detection of angular velocity by sampling and holding of a displacement detection signal by synchronizing to the timing where the appropriate directional component from the circulating drive is at a maximum and a minimum, in a circuit similar to synchronous detection circuit 25 illustrated in FIG. 7.

Figure 8:
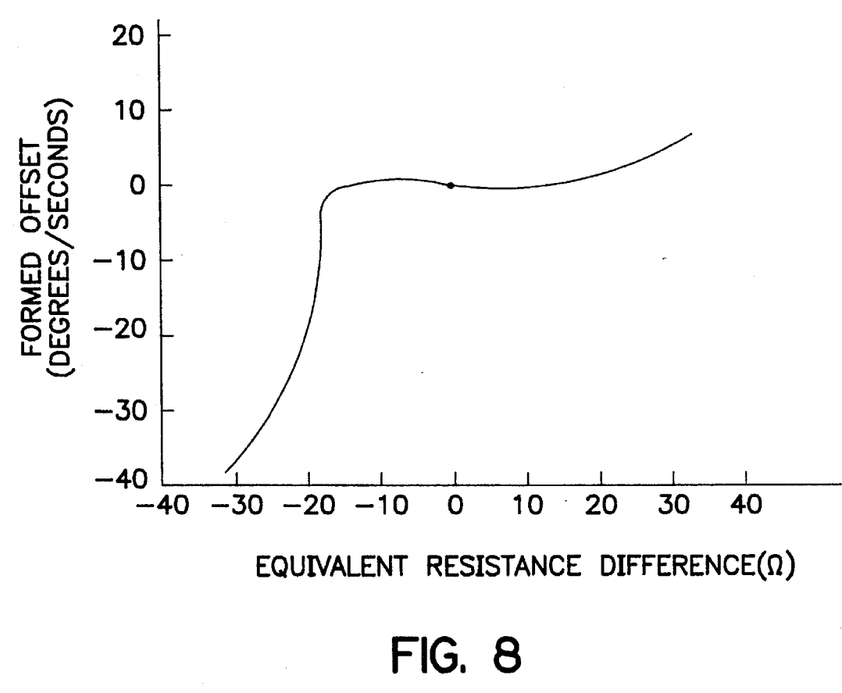
FIG. 8 illustrates the formation of voltage offset by the equivalent resistance differences between two piezo-electric elements illustrating one problem in prior technology.

However, in the conventional synchronous detection circuits as described above, the input signal level does not always necessarily have linear characteristics. For example, when there is a difference in the equivalent resistances of piezo-electric elements 2 and 3, leakage signals that are in-phase or out of phase with the drive signal from drive apparatus 6 are inputted, thereby creating an offset where the direct current level varies, as illustrated in FIG. 8.

On the other hand, taking the periodic external force F (t) as $$F(t) = F_o \cos \omega t \quad (1)$$

the displacement x (t) of vibrator 4 becomes $$x(t) = \frac{mF_o(\omega_o^2 - \omega^2)}{m^2(\omega_o^2 - \omega^2)^2 + r^2\omega^2} \cos \omega t + \frac{rF_o\omega}{m^2(\omega_o^2 - \omega^2)^2 + r^2\omega^2} \sin \omega t \quad (2)$$

Here, r is the damping constant, m is the equivalent mass, and $\omega_o$ is the mechanical series resonance angular frequency ($2\pi f_s$). Also, displacement velocity X (t) shown as a vector is $$X(t) = \frac{-mF_o\omega(\omega_o^2 - \omega^2)}{m^2(\omega_o^2 - \omega^2)^2 + r^2\omega^2} \sin \omega t + \frac{rF_o\omega^2}{m^2(\omega_o^2 - \omega^2)^2 + r^2\omega^2} \cos \omega t \quad (3)$$

Figure 2A:
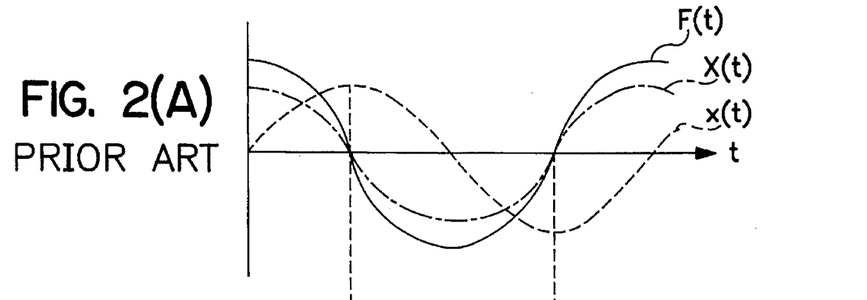
FIG. 2 is a signal wave form diagram for explaining the operation of the example in FIG. 1.

Consequently, displacement x(t) of vibrator 4 vibrating at $\omega = \omega_o$ and displacement velocity X(t) respectively become $$x(t) = \frac{F_o}{r\omega_o} \sin \omega_o t \quad (4)$$

$$X(t) = \frac{F_o}{r} \cos \omega_o t \quad (5)$$

where at a time coefficient the same as external force F (t), the times where displacement velocity X(t) is a maximum and a minimum will agree with the times where external force F(t) is maximum and minimum. FIG. 2(A) shows wave form diagrams of the above described F(t), x(t) and X(t).

Similarly, the Coriolis force $F_c(t)$ generated by the applied angular velocity W is shown as $$\begin{aligned} F_c(t) &= -2m\Omega \cdot X(t) \\ &= \frac{-2m\Omega F_o}{r} \cos \omega_o t \end{aligned} \quad (6)$$

where it goes to a maximum and a minimum at the same times when displacement velocity X(t) is maximum and minimum.

Consequently, when the output of differential amplifier 20 is sampled and held at times when displacement velocity X(t) is at a maximum and a minimum, it becomes theoretically possible to detect the angular velocity.

However, when the currents flowing in a pair of piezo-electric elements 2 and 3 are amplified and fed back to drive apparatus 6, as exemplified in FIG. 4, if we take drive signal v(t) of drive apparatus 6 corresponding to the external force as $v(t) = v_o \cos \omega t$ and the parallel admittances of piezo-electric elements 2 and 3 as Y, then current I(t) flowing in piezo-electric elements 2 and 3 becomes $$I(t) = Y \cdot v_o \cos \omega t \quad (7)$$

and, particularly, taking the force coefficient at the mechanical series resonance angular frequency $\omega_o$ as $$I(t) = \frac{A^2 v_o}{r} \cos \omega_o t$$

then the voltage value $v_{out}(t)$ from integrating amplifier 17 corresponding to the displacement and time differential value of the voltage $V_{out}(t)$ obtained by its integration and displayed as a vector can be respectively displayed as $$v_{out}(t) \alpha \cos \omega_o t \quad (8)$$

$$V_{out}(t) \alpha \omega_o \sin \omega_o t \quad (9)$$

It becomes possible to detect as a signal where the phase is electrically displaced at $\pi/2$, relative to the actual motion of vibrator 4 shown by formulas (4) and (5) above.

Figure 2B:
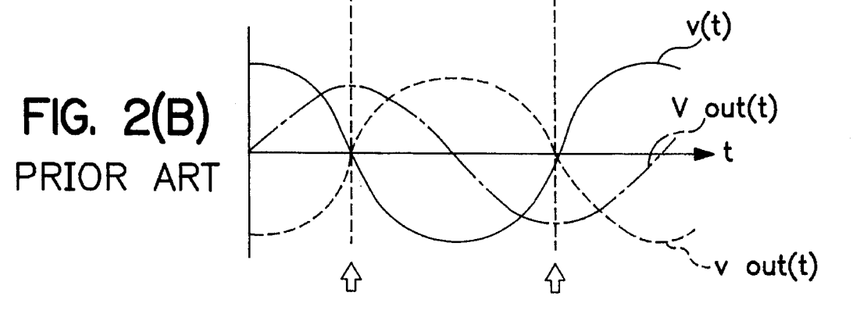

Therefore, even when the output of differential amplifier 20 is sampled and held at a time when displacement velocity X(t) is a maximum and a minimum, the observed value is $V_{out}(t) = 0$. As a result, the velocity is observed as being zero at such times in terms of electric signals, so that the angular velocity becomes undetectable. Wave form diagrams for the above v(t), $v_{out}(t)$ and $V_{out}(t)$ are given in FIG. 2(B).

SUMMARY OF THE INVENTION

The present invention solves the problems of the prior art as described above. An object of the invention is to provide an angular velocity detection circuit for a vibrating gyroscope which is capable of detecting angular velocity at good efficiency, while also being capable of suppressing formation of offset to a very low degree even when there are differences in the equivalent resistances of a piezo-electric element pair.

In an embodiment of the invention, an angular velocity detection circuit is provided. A vibrator has a pair of piezoelectric elements on the side surface of a vibration member having a resonance point. A detection circuit detects differences in the current flowing in a pair of piezo-electric elements under the resonance state of the vibrator. A sample and hold circuit samples and holds the output of the detection circuit at a timing where the displacement velocity of the vibrator becomes zero. The angular velocity is detected based on the output of this sample and hold circuit.

In another embodiment of the invention, one electrode of one piezo-electric element is connected to one feedback input terminal of one feedback amplifier and one electrode of the other piezo-electric element is connected to the feedback input terminal of the other feedback amplifier. The other electrodes of the piezo-electric elements are connected to a compensation signal output terminal of the drive apparatus that outputs a compensation signal of the damping capacity of the vibrator. The respective signal output terminals of the two feedback amplifiers are connected to the signal output terminal of the drive apparatus that outputs the drive signal of the vibrator. The compensation signal and the signals of the other electrodes of the pair of piezo-electric elements are combined. The combined signal is fed back to the drive apparatus so that the vibrator is given self-induced vibration at its mechanical series resonance frequency. The detection circuit detects the output differences of the two feedback amplifiers.

When the sampling and holding by the sample and hold circuit is done at a time where the displacement velocity of the vibrator is at zero, the difference in the currents flowing in the pair of piezo-electric elements detected by the detection means is sampled and held at a time when the detection signal of angular velocity is at a maximum and a minimum.

DETAILED DESCRIPTION OF THE INVENTION

The invention will next be explained by examples, with reference to the drawings.

Figure 1:
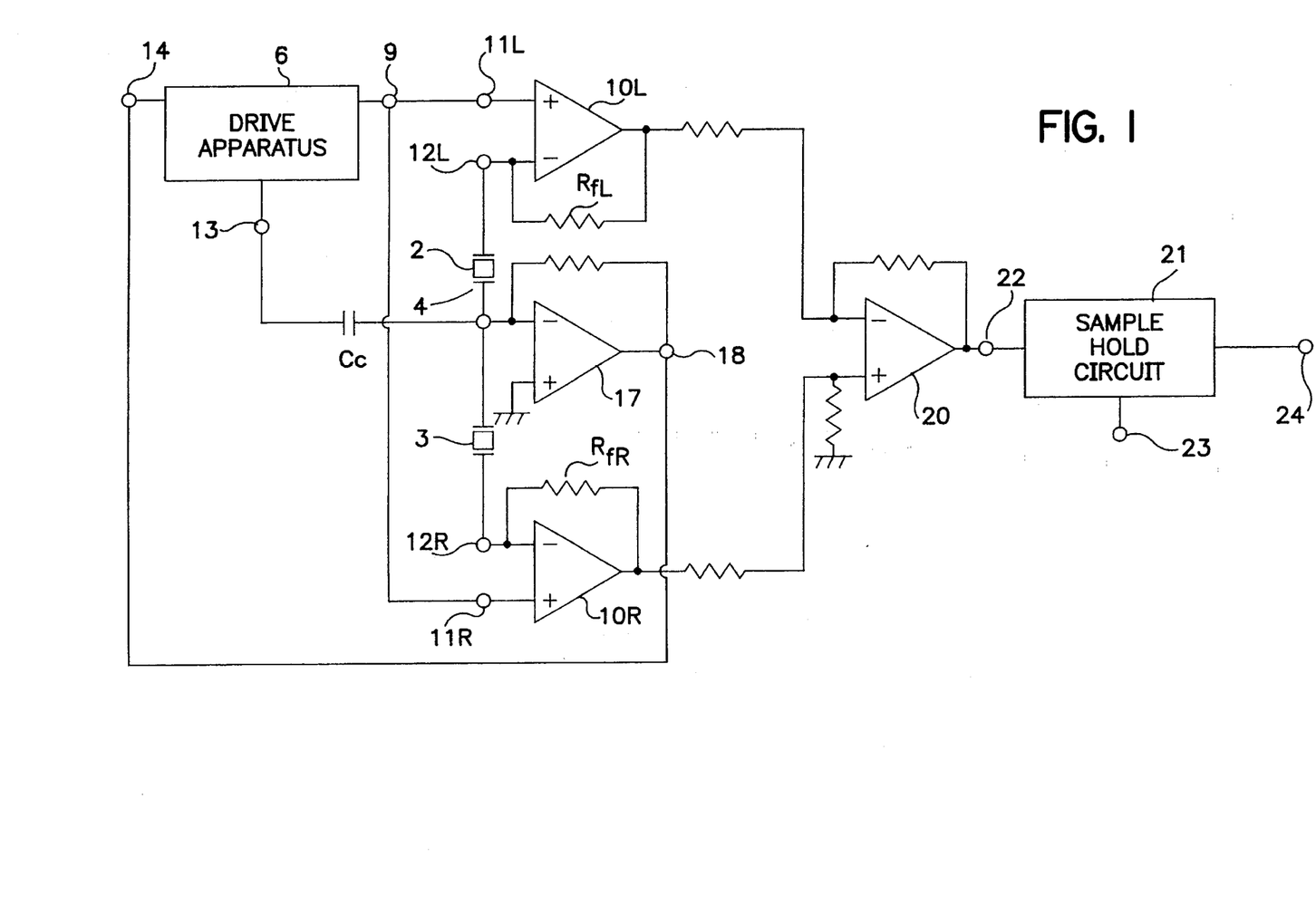
FIG. 1 illustrates an example of the invention.

FIG. 1 illustrates an example of the invention. The angular velocity in a vibrating gyroscope, as illustrated in FIG. 4, is detected. The signal output terminal 9 of drive apparatus 6 is connected to signal input terminals 11L and 11R of feedback amplifiers 10L and 10R, respectively, having feedback resistances $Rf_L$ and $Rf_R$. The feedback input terminals 12L and 12R of the feedback terminals 10L and 10R are connected to one electrode each of piezo-electric elements 2 and 3. The other electrodes of piezo-electric elements 2 and 3 are connected via capacitor Cc to compensation output signal 13 of drive apparatus 6. A compensation signal of the damping capacity of vibrator 4 is outputted at the compensation output signal 13. The compensation signal is combined with the signals of the other electrodes of piezo-electric elements 2 and 3. This combined signal is amplified at integrating amplifier 17. Output terminal 18 of integrating amplifier 17 is connected to input terminal 14 of drive apparatus 6, so that vibrator 4 is given self-induced vibration. In other words, the vibrator oscillates at or near its resonance frequency. Also, the outputs of feedback amplifiers 10L and 10R are supplied to differential amplifier 20.

The output of differential amplifier 20 is supplied to the signal input terminal 22 of sample and hold circuit 21. Pulse input terminal 23 of the sample and hold circuit 21 is supplied with the sampling pulse of the timing, shown by dashed lines and indicated by arrows in FIG. 2. The output of differential amplifier 20 is supplied to output terminal 24 by the sampling pulse, i.e., at the time when the vector-displayed displacement velocity X(t) goes to zero. Thus, the angular velocity acting on vibrator 4 is detected based on the output signal of sample and hold circuit 21.

In this manner, when the output of differential amplifier 20 is sampled and held at a time where the vector-displayed displacement velocity X(t) is at zero, the angular velocity detection signal $V_{out}(t)$ shows a maximum value and a minimum value. The angular velocity can, therefore, be detected with the greatest efficiency.

Figure 3:
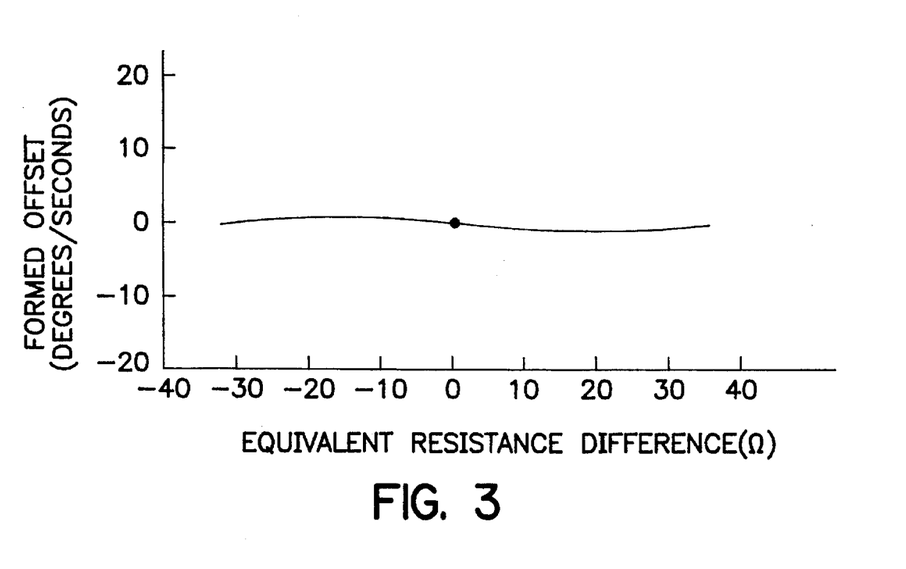
FIG. 3 illustrates the formation of voltage offset from the equivalent resistance differences of two piezo-electric elements shown in FIG. 1.

Even if there is a difference in the equivalent resistances of piezo-electric elements 2 and 3 and a leakage signal that is in-phase or out of phase with drive signal v (t) of drive apparatus 6 is input in the output of differential amplifier 20, the output of differential amplifier 20 is sampled and held at a time where drive signal v(t) goes to zero. Therefore, as shown in FIG. 3, variations in the direct current level are suppressed to a very low degree regardless of the equivalent resistance difference.

Furthermore, this invention can be in numerous forms and variations without being restricted to the example described. For example, although operational amplifiers are used as feedback amplifiers 10L and 10R, other feedback amplifiers can also be used.

It is also possible to have a system where the output of integrating amplifier 17 is inversely amplified by an inverting amplifier to make it in-phase with the drive signal and the output of the inverting amplifier is supplied via respective variable resistances to feedback input terminals 12L and 12R of feedback amplifiers 10L and 10R. In such a system, currents corresponding to the currents flowing in the equivalent resistances of piezo-electric elements 2 and 3 will flow into feedback input terminals 12L and 12R. The only current that flows in feedback resistances $Rf_L$ and $Rf_R$ of feedback amplifiers 10L and 10R is current that corresponds to the Coriolis force, i.e., the imaginary part of the current without any flow of the real part of the current. Accordingly, it is possible to effectively decrease formation of low voltage in feedback amplifiers 10L and 10R and to effectively amplify the phase component corresponding to the input angular velocity, thereby, making it possible to detect the angular velocity at higher accuracy.

Further, it is also possible to vary the signals that are in-phase with the drive signal supplied to feedback input terminals 12L and 12R of feedback amplifiers 10L and 10R, according to the temperature dependence of the equivalent resistances of piezo-electric elements 2 and 3. In this case, the output of integrating amplifier 17 and the compensation signal from drive apparatus 6 may be supplied to the integrating amplifier and combined. The output similarly may be supplied to feedback input terminal 12L and 12R of feedback amplifiers 10L and 10R by compensating for minute differences in the equivalent resistances of piezo-electric elements 2 and 3 with variable resistances.

When this is done, the currents supplied to the feedback input terminals 12L and 12R of feedback amplifiers 10L and 10R from the integrating amplifier, where the output of integrating amplifier 17 and the compensation signal from drive apparatus 6 are combined, correspond to the currents flowing in the equivalent resistances of piezo-electric elements 2 and 3, and, thus, vary in correspondence with their temperature dependence. Consequently, even under variations in the ambient temperature, there is never any flow of the real part of current in feedback resistances $Rf_L$ and $Rf_R$ of feedback amplifiers 10L and 10R, but only flow of current corresponding to the Coriolis force, i.e., the imaginary part of the current. It is, therefore, possible to effectively decrease the formation of low voltage and fluctuations to more effectively amplify the phase component corresponding to the input angular velocity to detect the angular velocity at higher accuracy.

It is also possible to use a differential amplifier instead of an integrating amplifier for combining the output of integrating amplifier 17 with the compensation signal. This differential amplifier can be supplied with the output of integrating amplifier 17 and the drive signal from drive apparatus 6. The differential outputs can be supplied via variable resistances to feedback input terminals 12L and 12R of feedback amplifiers 10L and 10R. Thus, the currents that flow into feedback input terminals 12L and 12R vary according to the current values flowing in the equivalent resistances of piezo-electric elements 2 and 3 and according to their temperature dependencies. The angular velocity can be detected in the same manner as described above, but with higher accuracy.

This invention can also be effectively applied in cases when, as disclosed in the above Japanese Patent Disclosure Hei 5-113336, two piezo-electric elements adhered to the side surface of a vibration member are inserted into the positive feedback loop of an amplifier to give self-induced vibration to the vibrator, while the angular velocity based on the feedback current values of these two piezo-electric elements is detected.

The inventive detection circuit detects angular velocity by sampling and holding the difference in currents flowing in the pair of piezo-electric elements at a time where the displacement velocity of the vibrator is zero, and under the resonance state of a vibrator having a pair of piezo-electric elements. Detection of the angular velocity at the greatest efficiency is possible. It is also possible to suppress direct current level fluctuations and, consequently, occurrence of offset, to a very low amount, even when there are differences in the equivalent resistances of a pair of piezo-electric elements.

Finally, the above described embodiments of the present invention are intended to be illustrative only. Numerous alternative embodiments may be devised by those skilled in the art without departing from the spirit and scope of the following claims.

We claim:

1. An angular velocity detection circuit for a vibrating gyroscope comprising, (a) a detection circuit, and (b) a vibrator having a vibration member having a side surface with a resonance point, (c) first and second piezo-electric elements on said side surface, each one of said piezo-electric elements having a first electrode and a second electrode, wherein said detection circuit detects differences in currents flowing in said first and second piezo-electric elements under a resonance state, and (d) a sample and hold circuit, wherein said sample and hold circuit samples and holds an output of said detection circuit at a time when displacement velocity of said vibrator becomes zero and angular velocity based on the output of said sample and hold circuit is detected.

2. The angular velocity detection circuit of claim 1 further comprising, (e) a drive apparatus having a compensation output terminal that outputs a compensation signal of damping capacity of said vibrator and a signal output terminal that outputs a drive signal, and (f) first and second feedback amplifiers, each one of said amplifiers having a feedback input terminal and a signal output terminal, wherein said feedback input terminal of said first feedback amplifier is connected to said first electrode of said first piezo-electric element, said feedback input terminal of said second feedback amplifier is connected to said first electrode of said second piezo-electric element, the second electrode of each of said first and second piezo-electric elements being connected to said compensation output terminal, and said signal output terminal of each of said feedback amplifiers being connected to the signal output terminal of the drive apparatus, a combined signal comprising said compensation signal and signals from said second electrode of each of said first and second piezo-electric elements being fed back to said drive apparatus, and wherein said detection circuit detects output differences of said first and second feedback amplifiers.

* * * * *